United States Patent [19]

Cuffiani et al.

[11] Patent Number: 5,500,397
[45] Date of Patent: Mar. 19, 1996

[54] COMPONENTS AND CATALYSTS FOR THE POLYMERIZATION OF ETHYLENE

[75] Inventors: Illaro Cuffiani, Ferrara; Umberto Zucchini, deceased, late of Ferrara, both of Italy, by Maria Stagni, Silvia Zucchini, Chiara Zucchini, heiresses

[73] Assignee: Montell North America Inc., Wilmington, Del.

[21] Appl. No.: 181,283

[22] Filed: Jan. 13, 1994

[30] Foreign Application Priority Data

Jan. 13, 1993 [IT] Italy ................... MI93A0026

[51] Int. Cl.$^6$ .................... B01J 31/38
[52] U.S. Cl. ............... 502/102; 502/114; 502/115; 502/118; 502/132; 502/134; 502/125; 502/111; 526/123.1; 526/125.5
[58] Field of Search ................ 502/111, 114, 502/115, 102, 118, 132, 134; 526/125

[56] References Cited

U.S. PATENT DOCUMENTS 4,886,770 12/1989 Cuffiani et al. ............ 502/104
5,300,470 4/1994 Cuffiani et al. ............ 502/110

FOREIGN PATENT DOCUMENTS 317200 11/1988 European Pat. Off. .
1513480 6/1975 United Kingdom .

*Primary Examiner*—Shrive Beck
*Assistant Examiner*—Timothy H. Meeks

[57] ABSTRACT

Solid catalyst component for the polymerization of ethylene including the product of the reaction between:

1) the product obtained by reacting:
   1A) a halide, halogen alcoholate or alcoholate of titanium, vanadium or zirconium;
   1B) a small quantity of water, and optionally
   1C) a compound or composition capable of substituting, in compound 1A, one or more alkoxy groups with a halogen atom; and 2) a complex having general formula:

$$MgX_2 \cdot nAlRX_2 \cdot pAlX_3$$

where X is chlorine or bromine; R is a hydrocarbon radical containing from 1 to 20 carbon atoms; n is a number from 1 to 4; p is a number from 0 to 1, and n+p from 1 to 4; the catalyst component being in the form or particles having a diameter lower than or equal to 20 micrometers, and an average diameter lower than or equal to 10 micrometers.

16 Claims, No Drawings

COMPONENTS AND CATALYSTS FOR THE POLYMERIZATION OF ETHYLENE

FIELD OF THE INVENTION

The present invention concerns catalyst components in the form of very fine particles, and catalysts obtained from them which are capable of producing ultra-high molecular weight ethylene polymers in powder form. Other objects of the present invention are a process for the preparation of the above mentioned catalyst components, and a process for the preparation of ultra-high molecular weight ethylene polymers.

BACKGROUND OF THE INVENTION

Ultra-high molecular weight ethylene polymers are particularly suited for the production of materials that need high mechanical properties, such as the impact and abrasion resistance required by parts destined for gear or arthroprosthesis, and the high tensile strength and modulus required by highly oriented fibers such as sailcloth.

It is known that it is particularly desirable that the ultra-high molecular weight polymers of ethylene and α-olefins (with intrinsic viscosity values in tetrahydronaphthalene at 135° C. not lower than 8 dl/g, generally from 8 to 30 dl/g, i.e., in terms of molecular weight, from 1,000,000 to 7,000,000) be in the form of very fine powders in order for them to offer good flowability and compactness. In fact, due to the high viscosity that the ultra-high molecular weight polymers present in the molten state even at high temperatures, the normal molding processes that use melted polymer are not adequate for the manufacture of products. In such cases an alternative to molding is provided by some techniques for converting powders in compact semi-finished materials, which can be used to manufacture finished products with the use of the proper machines, such as lathes and cutters. Said techniques are:

I) "compression molding", consisting of obtaining thick sheets (up to 80 mm thick) by way of cohesion and compaction of polymer powders at high temperatures and under high pressure;

II) "ram extrusion" consisting of obtaining cylindrical rods with a diameter up to 80–100 mm using ram extruders.

The finer the particles of the starting polymer powders, with a regular form and a controlled particle size distribution, the better the physico-mechanical properties of the above mentioned semi-finished materials. An additional factor that improves the workability and quality of the finished product is the porosity of the polymer particles.

The above mentioned characteristics of the powders cannot be obtained optimally by way of milling the solid catalyst component or the polymers produced thereby, because milling produces powders with unequal dimensions, irregular form, and uncontrollable particle size distribution. When the solid catalyst component is milled, all irregularities are reproduced in the resulting polymer due to the replication phenomenon. Another undesired consequence of milling is decreased consistency and porosity of the polymer particles.

The morphologic irregularity of the polymer powders obtained by milling causes poor flowability, and a deterioration of the physico-mechanical properties of the products obtained by compression molding.

Therefore, it is desirable to have catalyst components in the form of very fine particles having a regular morphology and controlled particle size distribution, which could produce, by way of replication, polymer powders with good shape characteristics and flowability, and suited to be used in compression molding and ram extrusion processes.

Catalyst systems capable of producing high molecular weight polymers are already known in the art.

U.S. Pat. No. 1,513,480 describes catalyst components for the polymerization of olefins obtained by way of reaction between a transition metal compound, selected from halogenated compounds and organic compounds containing oxygen, and a solid product, insoluble in hydrocarbons, comprising compounds containing at least one M metal and a halogen, obtained by decomposition, to metal dihalide or products containing metal dihalides, of a complex of general formula

$MX_2 \cdot nAlRX'_2 \cdot pAlX_3$ where M is magnesium or manganese; X' is a halogen; X is a halogen or an alkoxy group; R is a hydrocarbon radical; n is a number from 1 to 4, p is less than or equal to 1, and n+p ranges from 1 to 4, extremes included.

The catalyst components, as will be demonstrated in the comparative example, in the form of fine particles, prepared as described in the above mentioned patent do not seem to be capable of producing polymer powders suitable for compression molding.

Published European Patent Application No. 317,200 describes a process for the preparation of ultra-high molecular weight polyethylene by using a catalyst comprising a solid catalyst component obtained by way of reaction between: a) the product of the reaction between a magnesium dihalide and a titanium tetraalcoholate, and b) the product of the reaction between an aluminum trihalide and silicon tetraalcoholate.

The use of a catalyst obtained from the catalyst component described in said patent application allows one to obtain a polymer in particle form with variable average dimensions, between 195 and 245 in the examples, and controlled particle size distribution, particularly adequate for gel spinning processes.

DESCRIPTION OF THE PREFERRED EMBODIMENTS

Italian patent application MI 91 A 001961, corresponding to co-pending U.S. Ser. No. 07/914,245, now U.S. Pat. No. 5,300,470, describes catalyst components for the production of ultra-high molecular weight polyethylene obtained by way of reaction between (A) a titanium compound containing at least one Ti—OR bond, and (B) a magnesium halide or an organic magnesium compound; the resulting product is reacted with a compound or composition (C) capable of substituting in the titanium compound at least one —OR group with a halogen atom. The preparation of said catalyst components foresee the addition of water before, during, or after the reaction between (A) and (B), and before adding the halogenated compounds present in (C).

The polymer particles obtained by using the above mentioned catalyst component in polymerization have a regular morphology, particularly fine particle size, low flowability values, and are particularly suited for compression molding.

A new catalyst component has now been prepared in the form of very fine particles, having a regular morphology, controlled particle size distribution, and high porosity, and therefore adequate for the preparation of polymer powders to be used in compression molding.

A particular advantage offered by the catalyst components of the present invention concerns the possibility of obtaining highly porous polymer particles. In fact, besides increasing the polymerization yield of the catalyst, highly porous catalyst component allow one to obtain, by morphological replication, polymer particles which are also porous, and, therefore, particularly adequate to be used in processes for the production of sheets (compression molding) and rods (ram extrusion).

Moreover, the ultra-high molecular weight polyethylene obtained by using the catalyst components of the present invention in polymerization, present, at equal intrinsic viscosity, resilience values considerably higher than the ones of polymers obtained from the catalysts described in Italian patent application MI 91 A 001961.

Therefore, one of the objects of the present invention is a solid catalyst component for the polymerization of ethylene comprising the product of the reaction between:
(1) the product obtained by reacting:
   1A) a halide, halogen alcoholate or alcoholate of titanium, vanadium or zirconium;
   1B) a small quantity of water, and optionally
   1C) a compound or composition capable of substituting, in compound 1A), one or more alkoxy groups, whenever present, with a halogen atom, and reducing the transition metal of compound 1A) to an oxidation state lower than 4 or both; and
(2) a complex having general formula:

$$MgX_2 \cdot nAlRX_2 \cdot pAlX_3$$

where X is chlorine or bromine; R is a hydrocarbon radical containing from 1 to 20 carbon atoms, particularly an alkyl radical with 1–10 carbon atoms, or a cycloalkyl radical with 6–8 carbon atoms, or a 6 to 8 carbon atoms aryl radical; n is a number from 1 to 4; p is a number from 0 to 1, and n+p from 1 to 4;

said catalyst component being in the form of particles having a diameter lower than or equal to 20 micrometers, and an average diameter lower than or equal to 10 micrometers.

The hydrocarbon chain of the halogen alcoholates and the alcoholates of the transition metal preferably comprises a $C_1$-$C_{20}$ alkyl, or $C_3$-$C_{20}$ cycloalkyl, or $C_6$-$C_{20}$ aryl radical.

The 1A compound is preferably selected from titanium alcoholates and halogen alcoholates, where the halogen atoms are preferably chlorine and bromide. Examples or titanium alcoholates or halogen alcoholates are the compounds of general formula:

$$Ti(OR)_nX_{4-n}$$

where R is a $C_1$-$C_{20}$ alkyl, cycloalkyl, or aryl radical and X is a halogen atom, preferably chlorine or bromide, and n varies from 1 to 4.

Among the titanium compounds particularly suited for the present invention are: Ti $(O$-n-$C_3H_7)_4$, Ti$(O$-n-$C_4H_9)_4$, Ti$(OC_6H_{11})_4$, Ti$(OC_6H_5)_4$, Ti$(O$-n-$C_4H_9)_3$Cl, Ti$(O$-n-$C_4H_9)_3$Br, Ti$(OC_2H_5)_2Cl_2$, Ti$(OCH_3)Cl_3$, Ti$(O$-n-$C_4H_9)Cl_3$, Ti$(OC_6H_5)_3$Cl, Ti$(O$-n-$C_4H_9)Br_3$, Ti$(O$-i-$C_3H_7)_4$, Ti$(O$-i-$C_3H_7)_2Br_2$, and Ti$O$-i-$C_5H_{11})Cl_3$.

The one compound that can be used among the completely halogenated titanium compounds is the $TiCl_4$.

Specific examples of vanadium and zirconium compounds that can be used for the preparation of the catalyst component according to the invention are: $VOCl_3$, $VO(O$-n-$C_3H_7)_3$, $V(O$-n-$C_3H_7)_4$, $V(OC_6H_5)_2Cl_2$, $VCl_4$, $Zr(O$-n-$C_3H_7)_4$, $Zr(O$-n-$C_4H_9)_3$Br, $Zr(O$-n-$C_6H_{13})_2Cl_2$.

Component 1C comprises one or more compounds which have a halogenating and/or reducing effect toward the 1A compounds.

The 1C components include inorganic compounds such as the aluminum and silicon compounds. Among the former, the preferred compound is $AlCL_3$; among the latter, there are silicon compounds containing only halogens, or, optionally, also containing hydrogen; the latter have a reducing effect as well. Examples of silanes are the compounds of general formula $SiX_{4-n}Y_n$, where X is halogen atoms and Y is hydrogen or halogen atoms, and n is a number from 0 to 3, such as $SiCl_4$; examples of polysilanes are the compounds of formula $Si_nO_nCl_{2n+2}$, where n is a number from 2 to 7, such as $Si_2OCl_6$; an example of halogenated polysilanes of formula $Si_nX_{n+2}$, where X is a halogen and n is a number from 2 to 6, such as $Si_4Cl_{10}$. $SiHCl_3$ is among the halosilanes of formula $SiH_{4-n}X_n$, where X is a halogen and n a number from 1 to 3. Suitable halogens are chlorine and bromine.

Other inorganic compounds that can be used as 1C compounds are: $TiCl_4$, $VCl_4$, $SnCl_4$, $SOCl_2$.

Among the 1C components there are also organometallic compounds, such as the aluminum derivatives, some examples of which are: $Al(C_2H_5)Cl_2$, $Al(i$-$C_4H_9)Cl_2$, $Al(C_3H_7)Br_2$, $Al(C_4H_9)_2Cl$. These compounds have both a halogenating and reducing effect. Other organometallic compounds are the silicon alkyl derivatives, such as the alkyl-halosilanes of formula $R_nSiH_xX_y$, where R is a $C_1$-$C_{20}$ aliphatic or $C_6$-$C_{20}$ aromatic radical, X is a halogen, n is a number from 1 to 3, x is a number from 0 to 2, and y is a number from 1 to 3, and the halogen-alkoxysilanes of formula $Si(OR)_{4-n}X_n$, where X is a halogen, R is a $C_1$-$C_{20}$ alkyl or $C_6$-$C_{20}$ aryl radical, and n is a number from 1 to 3, some examples of which are: $C_2H_5SiCl_3$, $(CH_3)_3SiCl$, $CH_3SiHCl_2$, $(C_2H_5O)SiCl_3$. Other silane compounds that may be used are polyhydrosiloxanes of general formula $[HSi(R)-O]_n$, where R is hydrogen, halogen, a $C_1$-$C_{10}$ alkyl, $C_6$-$C_{20}$ aryl, $C_6$-$C_{20}$ alkoxy, or $C_6$-$C_{20}$ aryloxy radical, and n ranges from 2 to 1000, preferably from 3 to 100. Examples of said compounds are: $(CH_3HSiO)_4$ and $(CH_3)_3SiO[(CH_3)HSiO]_nSi(CH_3)_3$. In these compounds some of the hydrogen atoms can be substituted with methyl groups. Suitable halogens are chlorine and bromine.

Other silicon compounds which contain hydrogen, and therefore can be used to cause a reducing effect, are: the silanes of formula $Si_nH_{2n+2}$, where n is a number greater than or equal to 1, preferably greater than or equal to 3, such as $Si_3H_8$; the polysilanes containing the $(SiH)_x$ group, where x is greater than or equal to 2; the alkyl or aryl silanes of formula $R_xSiH_{4-x}$, where R is an allyl or aryl, and x is a number from 1 to 3, such as $(C_6H_5)_3SiH$; the alkoxy or aryloxy silanes of formula $(RO)_xSiH_{4-x}$, where R is a $C_1$-$C_{20}$ alkyl or $C_6$-$C_{20}$ aryl radical, and x is a number from 1 to 3, such as $(C_2H_5)_3SiH$.

It is also possible to use a combination between a compound with a halogenating effect, and one with a reducing effect; examples of the latter are: Na-alkyls, Li-alkyls, Zn-alkyls, and the corresponding aryl derivatives, NaH, LiH, or the binary system Na+alcohol.

Examples of organic compounds with halogenating action that can be used as compound 1C are: $C_6H_5CCl_3$, $C_6H_5COCl$, $Cl_3CCOCl$.

The preferred halogens in the 1C compounds mentioned above are chlorine and bromine.

Typical examples of complexes (2) are those having the following formula:

$$MgCl_2 \cdot 2AlC_2H_5Cl_2 \cdot AlCl_3, \quad MgCl_2 \cdot 2,5Al(i\text{-}C_4H_9)Cl, \text{ and}$$

$$MgCl_2 \cdot 1,5Al(n\text{-}C_4H_9)Cl_2.$$

Another object of the present invention concerns the process used for the preparation of the above mentioned catalyst component, comprising:

(a) the reaction between a halide, halogen alcoholate or alcoholate of titanium, vanadium or zirconium (compound 1A) with a small quantity of water 1B, and optionally with component 1C, resulting in a liquid product (1);

(b) the subsequent reaction, carried out by stirring the mixture, of the liquid product thus obtained with complex (2) maintained in the liquid state.

The quantity of water added during the preparation of the catalyst component according to the process of the present invention, preferably ranges from 0.1 to 0.5 moles per mole of transition metal, more preferably from 0.1 to 0.3.

There are various methods for adding the water; the preferred one is dropwise while component 1A is kept under agitation.

Although normally the product of the reaction (a) is liquid even in the absence of solvents, in order to obtain the solid catalysts components of the present invention, which as already stated are made up of small particles with a narrow particle size distribution, it is necessary that components (1) and (2) be contacted after dilution in opportune solvents, preferably stirring vigorously during the reaction.

Examples of solvents that can be used for component (1) are aliphatic, cycloaliphatic, or aromatic hydrocarbons, such as: isobutane, pentane, hexane, cyclohexane, benzene, toluene. Said solvents are used in varying quantities, preferably from ¼ to 1 time in volume with respect to the total volume of components (1) and (2).

Solvents adequate for component (2) are the aluminum alkyl dihalides, particularly this can be the same $AlRX_2$ used in the preparation of component (2) (such as $AlC_2H_5Cl_2$, for example). In this case component (2) is prepared by using an excess of aluminum alkyl dichloride with respect to the values indicated in the general formula described above. Preferably said excess is 1–2 times the value of n in said formula.

Component 1C is used in such quantities as to have from 0.5 to 100, more preferably from 1 to 30 g-atom of halogen per g-atom of titanium, vanadium or zirconium and from 0.1 to 100, more preferably from 0.5 to 20, g-equivalent of reducing compound per g-atom of titanium, vanadium or zirconium.

Components (1) and (2) are made to react in such quantities as to have a ratio in g-atoms preferably ranging from 0.02 to 20.

The temperature at which reactions (a) and (b) are carried out can range from 0° to 250° C. preferably from 20° to 150° C. The operation takes place at atmospheric pressure or higher.

The stirring velocity during reaction (b) can vary greatly, depending on the characteristics of the reactor (volume, form) and the agitator; as a way of example, the stirring velocity can range from 500 to 1300 rpm (revolutions per minute).

As previously stated, by operating according to the method described above one obtains a catalyst component in the form of spherical particles having high surface area and porosity values, a diameter smaller than or equal to 20 micrometers, and an average diameter smaller than or equal to 10 micrometers, preferably ranging from 5 to 8 micrometers. Moreover, the particle size distribution of said particles is such that their diameter generally ranges from 2 to 20 micrometers.

The porosity is measured by way of the commonly used mercury absorption technique; the values thus obtained comprise also the value of the volume of the voids between the particles. It is also possible to evaluate the real porosity of the particles of the catalyst component by subtracting from the total porosity value that of the volume of the pores having a diameter greater than a specific value, which, depending on the morphology of the particles being evaluated, presumably corresponds to the voids between the particles.

The catalyst components of the present invention have a real porosity which varies preferably from 0.1 to 1.5 ml/g.

The values of the surface area generally vary from 5 to 70 $m^2/g$.

The same correction used for the calculation of the real porosity can be used to calculate the real surface area. However, the corrected values obtained in this manner do not vary substantially from the ones of the total surface area (including also the voids between the particles), as one can see from the data reported in the example.

Another object of the present invention is a catalyst comprising the solid catalyst component described above, and an organic compound of aluminum, preferably an aluminum alkyl compound, for the homopolymerization of ethylene and/or the copolymerization of ethylene with α-olefins.

Examples of aluminum compounds that can be used are: $Al(C_2H_5)_3$, $Al(i-C_4H_9)_3$, $Al(C_2H_5)_2Cl$, $Al(n-C_3H_7)_2Cl$, $Al_2(C_2H_5)_3Cl_3$; the first two are the preferred ones.

The molar ratio between the aluminum compound and the solid catalyst component generally ranges from 0.1 to 1000, preferably one uses a ratio greater than 100.

The polymerization is carried out in liquid or gas phase, according to commonly used methods. The liquid phase may consist of the monomer to be polymerized, or may include an inert hydrocarbon diluent, such as butane, pentane, heptane, or cyclohexane.

Generally the polymerization is carried out at a temperature ranging from 0° to 100° C., and at atmospheric pressure or higher. In particular, in the case of copolymerization of ethylene with α-olefins it is best to carry out the reaction at a temperature ranging from 50° to 90° C.

Ultra-high molecular weight polymers have an intrinsic viscosity in tetrahydronaphthalene at 135° C. not lower than 8 dl/g, preferably from 8 to 30 dl/g.

The polymerization process is carried out in the absence of molecular weight regulators, or in the presence of a limited quantity of same. One molecular weight regulator is hydrogen.

The copolymers are prepared by copolymerization of ethylene with small quantities of $C_3$-$C_{10}$ α-olefins, such as for example propylene, 1-butene, 1-hexene, 4-methyl-1-pentene, and 1-octene.

The polymer particles obtained with the catalyst system of the present invention have an average diameter smaller than or equal to 200 micrometers. The average diameter of the polymer particles is usually determined by sifting, using screens with increasingly finer mesh. The average diameter is the diameter to which 50% by weight of the particles are either smaller than or equal to.

The data reported in the examples have been determined with the following methods:

—intrinsic viscosity (I.V.): in tetrahydronaphthalene at 135° C.;
—density: ASTM 792, condition D;
—yield strength: DIN 58836;
—tenacity: DIN 58836;
—elongation at break: DIN 58836;
—hardness: ASTM 785, condition D;

—resilience: DIN 58836.

The porosity and surface area of the catalyst component have been calculated by introducing a known quantity of catalyst component in a dilatometer which is then filled with mercury. Subsequently one carries out the measurements using a C. Erba "Porosimetro 2000" mercury instruments.

The particle size distribution and the average diameter of the catalyst component are determined by laser beam diffraction, using a 2600 Malvern instrument apparatus.

The mechanical characteristics shown on Table 4 have been evaluated on polymer specimens obtained by "compression molding". The dimensions of said specimens are 100×100×12 mm, and they are obtained operating at a temperature of 216° C., and a pressure of 25 tons for 30 seconds and then 15 tons for 10 minutes. Subsequently the specimens are allowed to cool for 7 minutes at a pressure of 15 tons, and finally they are removed from the mold.

The following examples are given in order to illustrate and not limit the present invention.

EXAMPLE 1 AND COMPARATIVE EXAMPLE 1 (1C)

Preparation of the Catalyst Component

A catalyst component according to the invention (Example 1) is prepared as follows:

Preparation of solution A:

In a 1 liter glass apparatus complete with agitator and maintained in nitrogen flow, are introduced 450 g of $Al(C_2H_5)Cl_2$, 36 g of $AlCl_2$, and 75 g of anhydrous $MgCl_2$. The suspension is heated to 115° C. and maintained at that temperature for 5 hours, thus obtaining a homogeneous solution. After the 5 hours the solution is cooled to 90° C. and diluted with 90 ml of toluene. Finally the solution is brought to ambient temperature, at which time it appears to be clear and stable;

Preparation of solution B:

In a 2 liter glass apparatus complete with agitator and maintained in nitrogen flow, are introduced first 300 g of $Ti(O\text{-}n\text{-}C_4H_9)_4$, and then, at ambient temperature, 2 g of water and 700 ml of heptane. Subsequently one adds, within a 15 minute period, 118 g of $AlCl_3$, which increases the temperature to 50° C. The contents are then heated to 100° C. while maintaining them in agitation for one hour. The solution is then cooled to 40° C.

In the apparatus containing solution B, maintained at 40° C. and stirred at 800 rpm, the entire solution A is introduced within the span of one hour at a constant flow, after which the contents are heated to 50° C. in one hour. The solution obtained is maintained under agitation for another hour, then it is allowed to settle while the suspension is kept at 50° C. Most of the reaction liquid is removed, and the solid compound is washed repeatedly with hexane until it is completely purified. The solid thus isolated and purified is vacuum dried at 50° C. in light nitrogen flow. The total quantity of the dry solid compound obtained is 248 g.

Tables 1 and 2 show the characteristics of the catalyst component obtained in this manner, as well as the data relative to comparative Example 1c, where the catalyst component is prepared according to the above mentioned process, but without adding water to solution B.

EXAMPLES 2–6

Ethylene Polymerization

The process of polymerization of all the examples given is carried out in solvent (hexane), and in the presence of the catalyst component of example 1. Moreover, in all the examples the monomer used was ethylene, and the cocatalyst was triisobutyl aluminum (TIBAL), in quantities of 0.32 g/l.

Table 3 and 4 show, respectively, the data relative to the polymerization and the properties of the polymer obtained.

TABLE 1

| | Analysis of catalyst component (% by weight) | | | | | |
|---|---|---|---|---|---|---|
| Ex. | Ti | $Ti_{3+}$ | Mg | Cl | Al | BuOH |
| 1 | 17 | 15.5 | 6.3 | 62.9 | 2.6 | 2.7 |
| 1c | 15.9 | 15.5 | 5.9 | 58.1 | 2.8 | 2 |

TABLE 2

| | Surf. area ($m^2/g$) | | Porosity (ml/g) | | Average Diameter |
|---|---|---|---|---|---|
| Ex. | total | real | total | real | micrometers |
| 1 | 50.5 | 48.9 | 0.942 | 0.244 | 6.92 |
| 1c | 30.6 | — | 0.787 | — | 14 |

TABLE 3

| Ex. | 2 | 3 | 4 | 5 | 6 |
|---|---|---|---|---|---|
| Catalyst (g) | 0.0169 | 0.0165 | 0.0160 | 0.0154 | 0.0143 |
| Temperature (°C.) | 70 | 80 | 85 | 85 | 70 |
| Ethylene pressure (bar) | 6 | 5 | 4.5 | 3.5 | 6 |
| Time (min) | 180 | 125 | 180 | 180 | 120 |
| Yield ($Kg_{polymer}/g_{cat}$) | 31.4 | 39.4 | 28 | 20.5 | 25 |

TABLE 4

| Example | 2 | 3 | 4 | 5 | 6c |
|---|---|---|---|---|---|
| I.V. (g/l) | 18.3 | 14.6 | 16.0 | 11.5 | 17.9 |
| Density (g/ml) | 0.9340 | 0.9374 | 0.9350 | 0.9380 | 0.9335 |
| Average diameter[1] of polymer particles (μm) | 218 | 235 | 210 | 189 | 480 |
| Tensile strength (Pa) | 39.7 | 37.6 | 36.0 | 40.2 | 29 |
| Elongation at break at 23° C. (%) | 275 | 320 | 345 | 390 | 362 |
| Hardness (R scale) | 69 | 63 | — | 58 | 51 |
| Abrasion ($mm^3/40$ m) | 7.5 | 7.5 | 7.5 | 7.0 | 9.5 |
| Resilience (mJ/m) | ≧84 | ≧139 | ≧125 | ≧148 | — |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A solid catalyst component for the polymerization of ethylene comprising the product of the reaction between:

(1) the product obtained by reacting:

1A) a halide, halogen alcoholate or alcoholate of a transition metal selected from the group consisting of titanium, vanadium and zirconium; and 1B) water, said water being present in an amount from 0.1 to 0.5 moles per mole of transition metal; and (2) a complex having general formula:

$$MgX_2 \cdot nAlRX_2 \cdot pAlX_3$$

where X is chlorine or bromine; R is a hydrocarbon radical containing from 1 to 20 carbon atoms; n is a number from 1 to 4; p is a number from 0 to 1; and n+p is from 1 to 4; said catalyst component being in the form of particles having a diameter less than or equal to 20 micrometers, and an average diameter less than or equal to 10 micrometers.

2. The solid catalyst component of claim 1, where compound 1A) is selected from compounds of general formula:

$$Ti(OR)_nX_{4-n}$$

wherein R is a $C_1$-$C_{20}$ alkyl, $C_3$-$C_{20}$ cycloalkyl, or $C_6$-$C_{20}$ aryl radical, X is a halogen atom, and n is from 1 to 4.

3. A catalyst for the homopolymerization of ethylene or for the copolymerization of ethylene with other alpha-olefins comprising the catalyst component of claim 1 and an organoaluminum compound.

4. The catalyst of claim 3 wherein said organoaluminum compound comprises an aluminum alkyl compound.

5. The catalyst of claim 3 wherein the molar ratio of said organoaluminum compound to said catalyst component is from 0.1 to 1000.

6. The catalyst of claim 3 wherein the molar ratio of said organoaluminum compound to said catalyst component is greater than 100.

7. The solid catalyst component of claim 1 wherein the product (1) comprises the product obtained by reacting the compound 1A), the compound 1B) and a compound 1C), said compound 1C) being a compound or composition capable of substituting, in said compound 1A), one or more alkoxy groups with a halogen atom or reducing the transition metal of said compound 1A) to an oxidation state lower than 4.

8. The solid catalyst component of claim 7 wherein said compound 1A) is selected from compounds of general formula:

$$Ti(OR)_nX_{4-n}$$

wherein R is a $C_1$-$C_{20}$ alkyl, $C_3$-$C_{20}$ cycloalkyl or $C_6$-$C_{20}$ aryl radical; X is a halogen atom and n is from 1 to 4.

9. The solid catalyst component of claim 8 wherein said compound 1C) comprises $AlCl_3$, $SnCl_4$ or $TiCl_4$.

10. A process for the preparation of a catalyst component for the polymerization of ethylene comprising:
(a) reacting a halide, halogen alcoholate or alcoholate of a transition metal selected from the group consisting of titanium, vanadium and zirconium; and water, said water being present in an amount from 0.1 to 0.5 moles per mole of transition metal to produce a liquid product (1); and
(b) reacting said liquid product (1) and a complex having general formula:

$$MgX_2-nAlRX_2-pAlX_3$$

where X is chlorine or bromine; R is a hydrocarbon radical containing from 1 to 20 carbon atoms; n is a number from 1 to 4; p is a number from 0 to 1; and n+p is from 1 to 4; said catalyst component being in the form of particles having a diameter less than or equal to 20 micrometers, and an average diameter less than or equal to 10 micrometers, and an average of said liquid product (1) and said complex (2), said mixture being in the liquid state.

11. The process according to claim 10 wherein said compound 1A) is selected from compounds of general formula:

$$Ti(OR)_nX_{4-n}$$

wherein R is a $C_1$-$C_{20}$ alkyl, $C_3$-$C_{20}$ cycloalkyl or $C_6$-$C_{20}$ aryl radical; X is a halogen atom and n is from 1 to 4.

12. The process according to claim 10 wherein step (a) comprises, reacting said compound 1A), said compound 1B) and a compound 1C) to produce said liquid product (1), said compound 1C) being a compound or composition capable of substituting, in said compound 1A), one or more alkoxy groups with a halogen atom or reducing the transition metal of said compound 1A) to an oxidation state lower than 4.

13. The process according to claim 12 wherein said compound 1A) is selected from compounds of general formula:

$$Ti(OR)_nX_{4-n}$$

wherein R is a $C_1$-$C_{20}$ alkyl, $C_3$-$C_{20}$ cycloalkyl or $C_6$-$C_{20}$ aryl radical; X is a halogen atom and n is from 1 to 4.

14. The process according to claim 12 wherein said compound 1C) comprises $AlCl_3$, $SnCl_4$ or $TiCl_4$.

15. A solid catalyst component for the polymerization of ethylene comprising the product of the reaction between:
(1) the product obtained by reacting:
1A) a halide, halogen alcoholate or alcoholate of a transition metal selected from the group consisting of titanium, vanadium and zirconium;
1B) water, said water being present in an amount from 0.1 to 0.5 moles per mole of transition metal; and
1C) $AlCl_3$, $SnCl_4$ or $TiCl_4$; and
(2) a complex having general formula:

$$MgX_2-nAlRX_2-pAlX_3$$

where X is chlorine or bromine; R is a hydrocarbon radical containing from 1 to 20 carbon atoms; n is a number from 1 to 4; p is a number from 0 to 1; and n+p is from 1 to 4; said catalyst component being in the form of particles having a diameter less than or equal to 20 micrometers, and an average diameter less than or equal to 10 micrometers.

16. A process for the preparation of a catalyst component for the polymerization of ethylene comprising:
(a) reacting a halide, halogen alcoholate or alcoholate of a transition metal selected from the group consisting of titanium vanadium and zirconium; and water, said water being present in an amount from 0.1 to 0.5 moles per mole of transition metal and $AlCl_3$, $SnCl_4$ or $TiCl_4$ to produce a liquid product (1),
(b) reacting said liquid product (1) and a complex (2) having general formula:

$$MgX_2-nAlRX_2-pAlX_3$$

where X is chlorine or bromine; R is a hydrocarbon radical containing from 1 to 20 carbon atoms; n is a number from 1 to 4; p is a number from 0 to 1; and n+p is from 1 to 4; said catalyst component being in the form of particles having a diameter less than or equal to 20 micrometers, and an average diameter less than or equal to 10 micrometers by stirring a mixture of said liquid product (1) and said complex (2), said mixture being in the liquid state.

* * * * *

UNITED STATES PATENT AND TRADEMARK OFFICE
CERTIFICATE OF CORRECTION

PATENT NO. : 5,500,397
DATED : March 19, 1996
INVENTOR(S) : Illaro Cuffiani et al It is certified that error appears in the above-indentified patent and that said Letters Patent is hereby corrected as shown below:

At col. 9, line 46, insert --solid-- before "catalyst".

At col. 9, line 65, before "of said liquid" delete ", and an average" and insert --by stirring a mixture--.

Signed and Sealed this

Twentieth Day of August, 1996

Attest:

BRUCE LEHMAN

Attesting Officer　　　Commissioner of Patents and Trademarks